(12) United States Patent
Vendrow (10) Patent No.: US 8,848,689 B1
(45) Date of Patent: Sep. 30, 2014

(54) TELEPHONY APPLICATION PLATFORM

(71) Applicant: RingCentral, Inc., San Mateo, CA (US)

(72) Inventor: Vlad Vendrow, Redwood Shores, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

(21) Appl. No.: 13/930,406

(22) Filed: Jun. 28, 2013

(51) Int. Cl.
*H04L 29/06* (2006.01)

(52) U.S. Cl.
CPC ............ *H04L 65/1053* (2013.01); *H04L 65/40* (2013.01)
USPC ............................ 370/351; 370/352; 370/353

(58) Field of Classification Search
CPC . H04L 65/1053; H04L 65/1056; H04M 7/009
USPC .......................................... 370/351, 352, 353
See application file for complete search history.

(56) References Cited

U.S. PATENT DOCUMENTS

| | | | |
|---|---|---|---|
| 8,351,592 B2 * | 1/2013 | Freeny et al. ................. | 379/225 |
| 2009/0252159 A1 * | 10/2009 | Lawson et al. ................ | 370/352 |
| 2011/0110511 A1 * | 5/2011 | Vendrow et al. ......... | 379/201.04 |
| 2011/0134804 A1 * | 6/2011 | Maes ............................ | 370/259 |
| 2011/0177797 A1 * | 7/2011 | Vendrow et al. ............ | 455/414.1 |
| 2011/0283259 A1 * | 11/2011 | Lawson et al. ................ | 717/121 |
| 2012/0254293 A1 * | 10/2012 | Winter et al. ................. | 709/203 |
| 2013/0148648 A1 * | 6/2013 | Alexander et al. ............ | 370/352 |
| 2013/0251129 A1 * | 9/2013 | Jasper et al. ............. | 379/112.05 |

* cited by examiner

*Primary Examiner* — Wei Zhao
*Assistant Examiner* — Robert M Morlan
(74) *Attorney, Agent, or Firm* — Weaver Austin Villeneuve & Sampson LLP (57) ABSTRACT

A hosted private branch exchange (PBX) platform includes associated application programming interfaces (APIs) that provide a range of integration points with the PBX platform that, in turn, enables the development of a broad range of applications that can customize and/or enhance the basic functionality of the underlying PBX platform.

19 Claims, 4 Drawing Sheets

TELEPHONY APPLICATION PLATFORM

BACKGROUND

Telephony services (e.g., voice and fax services) continue to evolve at a rapid pace with telephony platforms and application service providers proliferating on the Internet. The spectrum of service offerings includes hosted private branch exchange (PBX) platforms that provide enterprise-level telephony services, to hosted voice XML services that provide script-based call handing and/or voice mail functionality. Existing platforms provide some level of customization but such options do not always keep pace with available options from third-party providers. However, making use of the options available from such providers can be difficult or inefficient to integrate with the provider of an enterprise's basic telephony service.

SUMMARY

Methods, systems, and computer program products are provided herein for providing a wide range of telephony services in connection with a private branch exchange (PBX) platform. According to a particular class of implementations, the private branch exchange (PBX) platform is configured to provide telephony services to a plurality of independent enterprises. Each of the enterprises has a plurality of users and extensions defined for that enterprise within the PBX platform. A plurality of telecommunications interfaces are provided with a plurality of independent telecommunications providers that facilitate at least a portion of the telephony services. One or more application programming interfaces (APIs) enable a plurality of telephony applications associated with different ones of the enterprises to integrate with the PBX platform at a plurality of integration points. The one or more APIs enable each of the telephony applications to access the users and extensions for the corresponding enterprise, and to control call flows for the corresponding enterprise during execution of the call flows by the PBX platform.

According to some implementations, an application developer environment is provided with which developers design first telephony applications of the plurality of telephony applications. The first telephony applications may be hosted by the PBX platform and/or at least some of the developers may also be users associated with one or more of the enterprises. Further, a telephony application store may be provided in which at least some of the first telephony applications are available for purchase by the enterprises. According to other implementations, the first telephony applications may be developed and hosted on one or more other platforms independent of the PBX platform.

According to some implementations, the telecommunications interfaces include a stateless low-level interface that provides signaling and media telephony primitives, and a high-level interface that tracks session states and provides function building blocks for the telephony applications.

According to some implementations, the PBX platform may include an account data repository storing account data representing the users and extensions for each enterprise, a sessions data repository, a message data repository, and a call log data repository.

According to some implementations, the PBX platform communicates with client devices using the Session Initiation Protocol (SIP).

According to some implementations, billing for use of one or more of the telephony applications by one of the enterprises is integrated with billing for use of the PBX platform by the enterprise.

A further understanding of the nature and advantages of various implementations may be realized by reference to the remaining portions of the specification and the drawings.

DETAILED DESCRIPTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

This disclosure describes a hosted private branch exchange (PBX) platform with associated application programming interfaces (APIs) that provide a range of integration points with the PBX platform that, in turn, enables the development of a broad range of applications that can customize and/or enhance the basic functionality of the underlying PBX platform. The APIs described herein provide these applications access to the data of the PBX platform and allow them to execute telephony functions on active calls while they are conducted by the PBX platform; handing control back and forth between the call flows being executed by the PBX platform and the process flows created by application developers. It should be noted that the following description employs the terms "telephony service" and "telephony application" to refer to the full range of services and functionality provided by PBX platforms; not just those related to voice communication.

Figure 1:
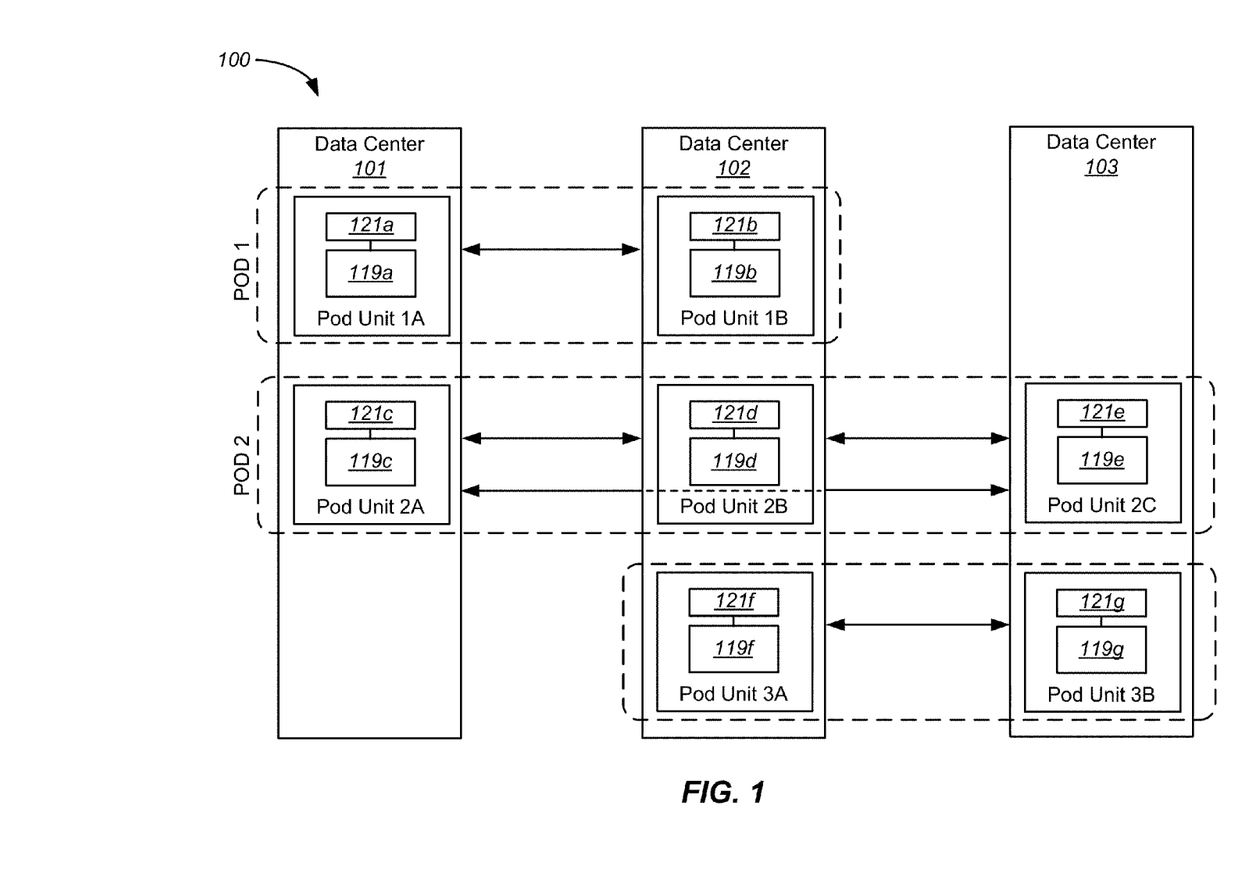
FIGS. 1 and 2 are simplified diagrams of an example of a communication system in which various implementations described herein may be practiced.
Figure 2:
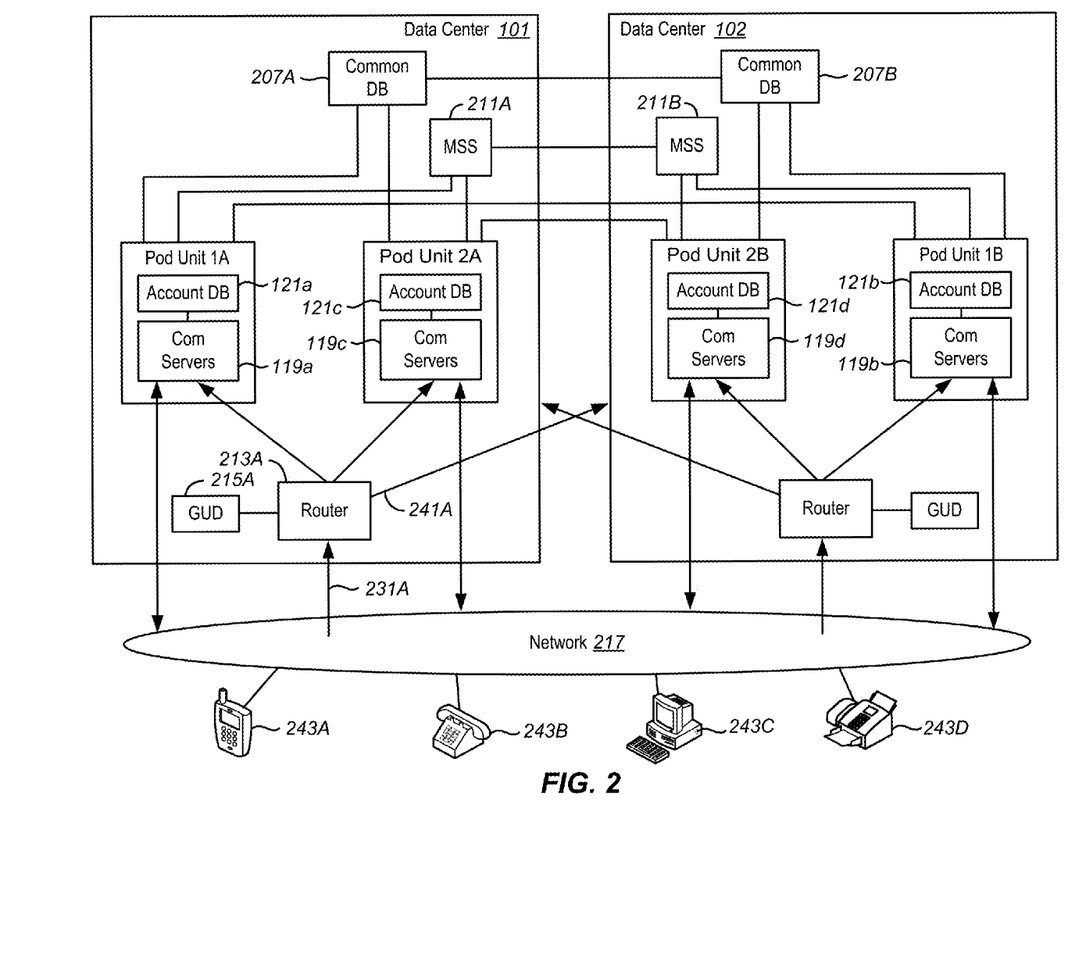

Various implementations described herein may be implemented in or in conjunction with a cloud-based communication system such as the one illustrated in FIGS. 1 and 2. FIG. 1 shows a communication system 100 which can be, for example, a hosted PBX platform that provides voice and video over IP, fax services, etc. Communication system 100 includes data centers 101, 102, and 103. Each data center is a point of presence (POP) that includes the network computing resources (e.g., servers, routers, switches, network connections, storage devices, etc.) necessary to support the services provided by communication system 100. Each data center is typically located in a different geographical region.

In this example, communication system 100 includes three user points of data (pods), i.e., pods 1, 2 and 3, each of which is a logical grouping of two or more pod units situated in different data centers. Each pod serves a different subset of user accounts. In this example, each pod unit (e.g., unit 2A) serves the same subset of users as the other pod units within the same pod (e.g., pod units 2B and 2C). Each pod unit includes a communication server 119a-119g configured to provide substantially the same services to the same subset of users as the other pod units within the same pod. Each pod unit also includes an account database 121a-121g configured to support the respective communication servers for the corresponding subset of users.

FIG. 2 shows various components of communication system 100 of FIG. 1. Specifically, FIG. 2 shows the various interconnections within and between data centers 101 and 102. Both data centers are in communication with network 217. Service requests from various communication devices 243A-243D are routed through network 217 to either or both of the data centers. Devices 243A-243D represent a great diversity of client devices that may connect with a services system designed in accordance with one or more implementations as described herein. Such client devices may include, for example (and without limitation), cell phones, smart phones, tablets, laptop and desktop computers, conventional telephones, IP phones, set top boxes, gaming consoles, etc. Reference to specific client device types should therefore not be used to limit the scope of the invention.

Data center 101 includes pod units 1A and 2A, a common database (CDB) 207A, a message storage system (MSS) 211A, a router 213A, and a global user directory (GUD) 215A. Additional pod units (not shown) may also be included in data center 101. Data center 102 is similarly configured and includes components that operate substantially the same as those in data center 101. Data centers 101 and 102 provide backup and redundancy to one another in the event of failure.

Communication servers 119 provide telecommunication services (e.g., voice, video, email, and/or facsimile) to corresponding subsets of users. Each server 119 may also provide other services including, for example, user account management and configuration, billing services, accounting services, etc. Each pod unit includes an account database 121 to support the communication server(s) for that particular pod unit, storing configuration details and other information regarding each user's account.

Pod units 1A and 1B are in communication with one another so that the data on their respective account databases are synchronized across data centers. Data center 101 includes router 213A to receive an incoming service request 231A from network 217. Router 213A parses the incoming service request to identify or extract a user key and queries GUD 215A to determine which pod is associated with the user key. Once the associated pod has been identified router 213A routes the service request to the pod unit in the data center associated with the identified pod. If the pod unit associated with the identified pod is not associated with data center 101, router 213A may route the service request to another data center (e.g., data center 102 as indicated by the arrow 241A).

Each pod unit of the data center 101 is also coupled to MSS 211A which stores files for the users served by pod units 1A and 2A. These files may include, for example, messages (e.g., voicemails and facsimiles), user logs, system messages, system and user call prompts (e.g., auto-attendant or user-recorded greetings), and other types of call-related or electronic messages. The contents of MSS 211A are synchronized with other data centers (e.g., synchronized with MSS 211B of data center 102).

Each pod unit in data center 101 is coupled to common database 207A which stores shared data for all of the pods, and stores consolidated information from account databases 121. Common database 207A also facilitates changes to the pod databases. For example, common database 207A may store data for applications that provide the services on communication servers 119. Different versions of the applications data may be stored in common database 207A which allow changes and upgrades to communication servers 119 to be implemented efficiently and conveniently. Changes may be made to common database 207A and propagated to pod units 1A and 2A. Common database 207A is synchronized across data centers to other common databases (e.g., common database 207B of data center 102). Common database 207A, MSS 211A, router 213A, and GUD 215A form a common layer of resources that are shared by all pod units in data center 101.

For more information regarding the nature of such a system with which various implementations described herein may be used, please refer to U.S. Patent Publication No. 2012/0134355 entitled User Partitioning in a Communication System filed on May 31, 2012, the entire disclosure of which is incorporated herein by reference for all purposes.

Figure 3:
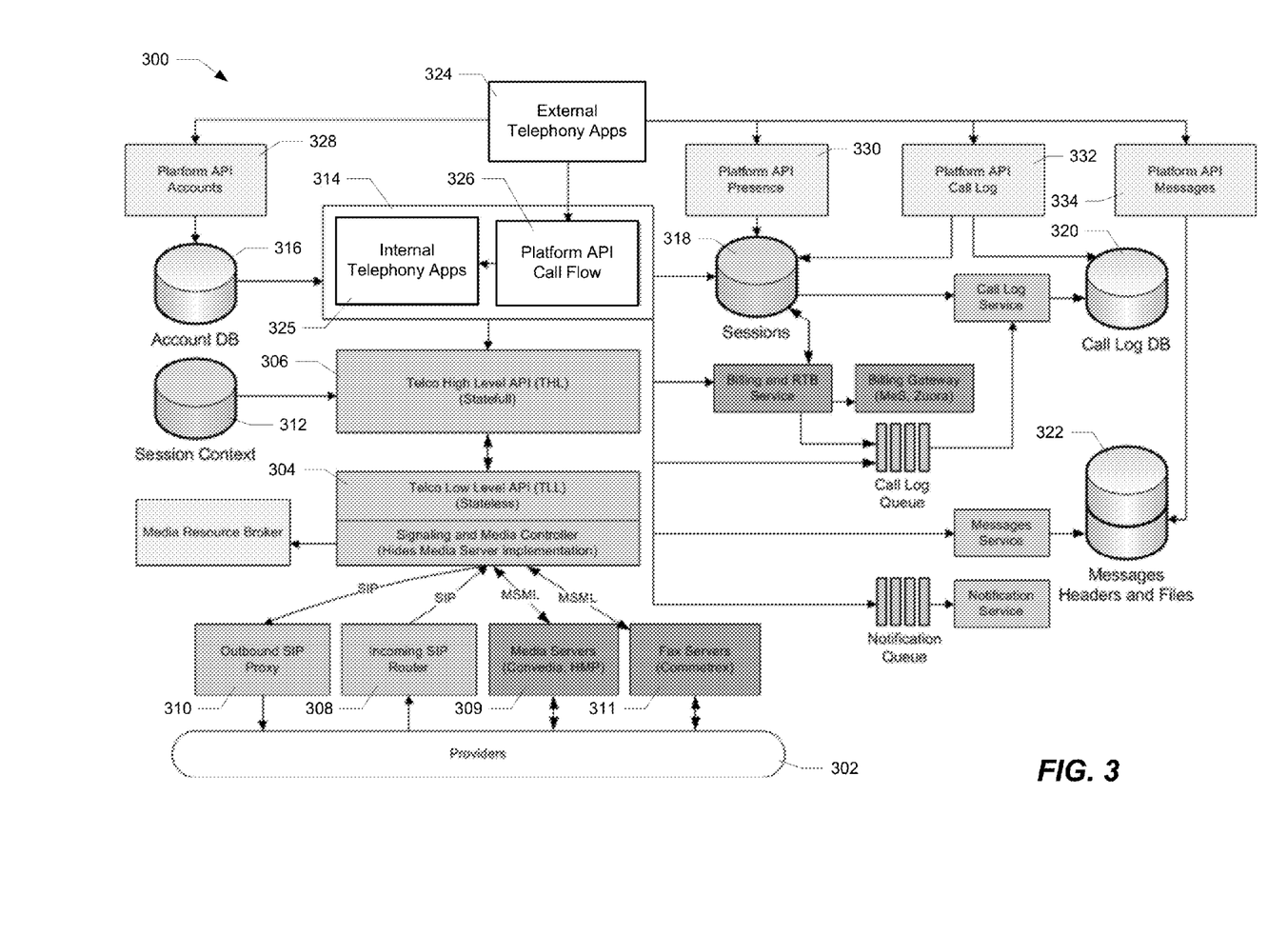
FIG. 3 is a simplified block diagram of an example of a telephony application platform employing techniques as described herein.

FIG. 3 is a simplified block diagram of an example of a PBX platform (e.g., such as communication system 100 of FIGS. 1 and 2) employing techniques as described herein. PBX platform 300 provides telephony services that allow communication among its users, and between its users and users associated with a variety of external telephony platforms 302 via telecommunication APIs 304 and 306, Outbound SIP Proxy 308, and Inbound SIP Router 310. Media Servers 309 and Fax Servers 311 provide functionality for processing voice over IP and fax over IP data, respectively. Telco API 304 is a stateless low-level API that provides signaling and media telephony primitives including, for example, call answering, placing of outbound calls, creation of conference call objects, addition of calls to conference call objects, playback of media for active calls, recording of active calls, etc. Telco API 306 is a higher-level API that has more sophisticated functionality such as, for example, interactive voice response (IVR), call forwarding, voice mail, etc. In the depicted implementations, telco API 306 doesn't have access to the PBX platforms databases, but maintains session context data 312 to support its functionality. Telco API 306 may include function primitives which can be used to support the development of telephony applications as described herein.

Outbound SIP Proxy 308, and Inbound SIP Router 310 employ the Session Initiation Protocol (SIP), an IETF-defined signaling protocol widely used for controlling communication sessions such as voice and video calls over the Internet Protocol (IP). SIP can be used for creating, modifying and terminating two-party (unicast) or multiparty (multicast) sessions, and may be one of the core protocols employed by systems configured as shown in and described above with reference to FIGS. 1 and 2. The latest version of the SIP specification is RFC 3261 from the IETF Network Working Group published in June 2002, the entirety of which is incorporated herein by reference for all purposes.

The core functionality of PBX platform 300 (e.g., as described above with reference to FIGS. 1 and 2) is accessed via telephony services block 314 which has access (not entirely shown for clarity) to the various data repositories of PBX platform 300, i.e., account DB 316, sessions DB 318, call log DB, 320 and message DB 322. Telephony services block 314 receives commands from telephony applications 324 and controls execution of the commands on the PBX platform 300. Telephony services block 314 may also include internal telephony applications 325 that are hosted and/or developed on or in connection with PBX platform 300. The depicted implementation also includes various APIs that allow external telephony applications 324 to interact with PBX platform 300 as described herein. The APIs associated with PBX platform 300 allow telephony applications 324 and 325 to integrate with basic functionality of PBX platform 300 at multiple integration points, to control call flows during execution of the call flows by the platform (e.g., via API 326), and to access platform data (e.g., in DBs 316-322 via APIs 328-334).

For example, the telephony applications may relate to a particular enterprise and might be integrated into call flows for that enterprise at the point where a call is made or received (e.g., enforcing blocked numbers), the company greeting level (e.g., company directory), the department level (e.g., call distribution), or at the individual level (e.g., call handling for individual extensions). And for each integration point, such applications can provide additional options, replace existing options, or augment existing options of the PBX platform functionality. In addition, the script that embodies such options can be hosted externally to the PBX platform, and hand control of call flows back and forth with the platform.

As another example, a script may be created to make calls and play notifications to customers, such as notifications that customer contact information has been changed. A script may also be created to execute as a call is received to determine whether the caller is on a user's dynamic list of blocked numbers, and if so, to terminate the call. A script may be created to execute at the company greeting level to play dynamic customer alerts that are hosted on a user's own system and not the PBX platform, such as customer-specific messages (e.g., based on caller ID), holiday alerts, or dynamic advertisements. Other scripts may be created at the company greeting level to enable a customized company directory, such as a company directory that uses natural language processing to determine the correct department or individual to answer the call (e.g., "How may I help you?" prompt) or a multiple level interactive voice response ("IVR") menu. A script may be created to execute at the department level to implement customized rules for distributing calls, such as company-specific rules for selecting customer service agents from a queue. A script may be created to execute at the individual level to implement customized greetings, such as an unavailability greeting based on the individual's calendar or other presence information, or to implement customized call screening or voicemail dialogs. The foregoing examples serve to illustrate the great diversity of telephony functionality that may be provided according to the techniques describe herein.

A telephony application script may return control of a call flow back to the application that called the script, such as the default application provided by the PBX platform or a script that called the current script, either after the current script has executed or at any point in the current script, such as upon the occurrence of a condition defined in the current script. In some implementations, part or all of the default application provided by the PBX platform may be exposed as a script to allow for a large number of integration points and flexible customization of the PBX platform.

According to a particular class of implementations, APIs having the functionalities described herein are implemented using the JavaScript Object Notation (JSON) data format described in RFC 4627 dated July 2006, the entirety of which is incorporated herein by reference for all purposes. This class of implementations is also implemented in accordance with at least some of the guiding principles embodied by the REST (REpresentational State Transfer) computing paradigm. The currently evolving notion of a "RESTful" system is based on the doctoral dissertion of Roy Thomas Fielding entitled *Architectural Styles and the Design of Network-based Software Architectures*, University of California, Irvine (2000), the entirety of which is incorporated herein by reference for all purposes. Although there is, as of yet, no ratified standard, a RESTful system generally observes a set of principles that define how Web standards such as HTTP and URLs may be used to facilitate heterogeneous application-to-application communication. Generally speaking, REST relates to resource-based systems in which URLs refer to the resources and HTTP methods are used to manipulate these resources. For additional information on RESTful systems, please refer to *A Brief Introduction to REST* posted by Stefan Tilkov on infoq.com on Dec. 10, 2007, the entirety of which is incorporated herein by reference for all purposes.

According to a specific class of implementations, the APIs define specific sets of responses for an application's various software components to the HTTP methods. That is, the APIs define sets of rules for how they and the various software components with which they interact operate on the contents of a query for each of the different methods. According to a particular implementation, the HTTP methods include the following:

"call"—Dial specified telephone number or SIP address

"conference"—Initiate or connect to specified conference

"end"—End current call

"if"—Define a condition (e.g., response, DTMF tone) to execute set of commands or script "info"—Return session information (e.g., voice/fax/text, caller/account ID(s), to/from phone number(s), SIP address (es))

"play"—Play specified recording or phrase

"prompt"—Play specified recording or phrase and receive response

"record"—Record one or more channels of current call

"receive"—Initiate the receiving of fax, text, or other message data over current call "redirect"—Redirect incoming call to company, department, or individual user (e.g., using name, phone number, extension, or SIP address)

"reject"—Reject incoming call

"result"—Return result of previous command (e.g., response to prompt, success/failure of command)

"script"—Run specified script

"send"—Send fax, text, or other message data over current call

"return"—Return control of call flow back to default or previous application

"transfer"—Transfer current call to company, department, or individual user (e.g., using name, phone number, extension, or SIP address)

"wait"—Wait a specified period of time before continuing execution of call flow

It will be understood that a wide range of other HTTP methods may be created or used, and that the foregoing list of HTTP methods should therefore not be used to limit the scope of the present invention.

Telephony applications 324 and 325 may provide a wide range of simple to highly complex functionality that enhances, augments, or replaces the functionality provided by PBX platform 300. Examples of areas of functionality include, but are not limited to, interactive voice response functionality, call center functionality, call statistics functionality, voice mail functionality, call blocking functionality, etc. In some implementations, media processing may be performed by servers hosted by telephony application developer and not PBX platform 300, for example, to perform customized automatic speech recognition or natural language processing for calls, after which control may be passed back to PBX platform 300, Virtually any telephony functionality that can be imagined by developers and integrated with a PBX platform may be supported.

As mentioned above, telephony applications 325 may be developed and/or hosted on PBX platform 300. For example, platform 300 may include an application developer environment (not shown) in which developers (who may be agents of, the platform provider, existing platform customers, or independent developers) design and deploy telephony applications. Alternatively, telephony applications 324 may be developed and/or hosted on other platforms independent of PBX platform 300. PBX platform 300 may also include a telephony application store (not shown) in which telephony applications (e.g., 324 and/or 325) are made available for purchase to customers of PBX platform 300.

According to some implementations, the telephony application store can offer advanced billing and analytics functionality based on the telephony applications' integration with PBX platform 300. While traditional application stores provide fixed billing based on a purchased application, the telephony application store may provide alternative billing based on the purchasers of telephony applications who may also be PBX platform subscribers. For example, the telephony application store may provide subscription billing corresponding to subscription billing for PBX platform 300, customized billing based on the number of individuals (e.g., employees of an enterprise customer) under a user account (e.g., a company account) or the number of telephone numbers under a user account, or usage billing based on usage of the telephony application or PBX platform 300 (e.g., number of callers, minutes used, storage used). In addition, because the telephony applications may be based on API calls processed by the PBX platform, a telephony application store integrated with PBX platform 300 can offer advanced analytics detailing usage of the telephony applications, such as call flow statistics and caller statistics.

Figure 4:
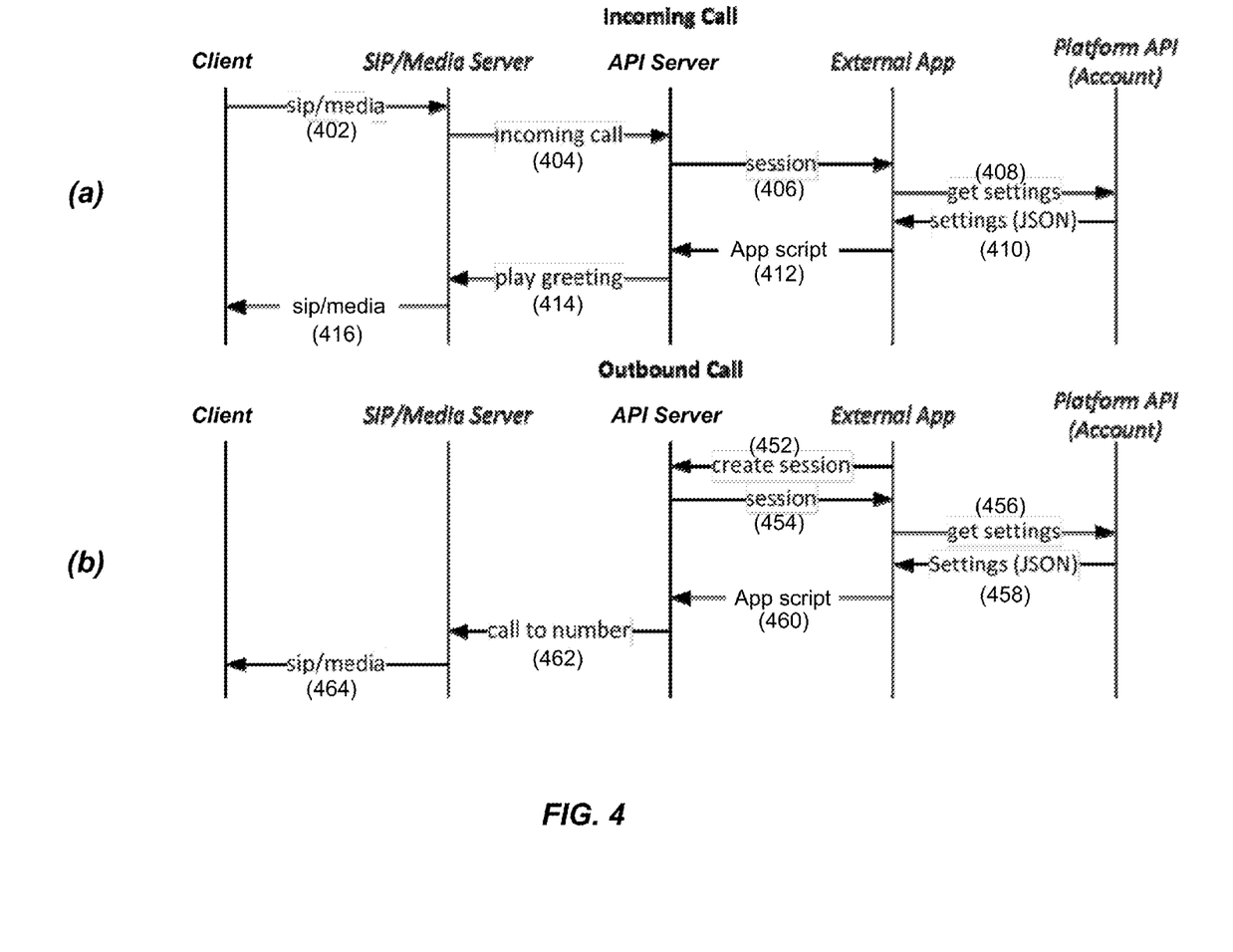
FIG. 4 includes flow diagrams illustrating incoming and outbound calls in the context of the telephony platform of FIG. 3.

FIG. 4 includes flow diagrams illustrating incoming and outbound calls in the context of the telephony platform of FIG. 3. In particular, FIG. 4(*a*) illustrates handling of an incoming call by a PBX platform (e.g., 300 of FIG. 3) in conjunction with an external telephony application (e.g., 324 of FIG. 3), while FIG. 4(*b*) illustrates handling of an outbound call in conjunction with an external application. It will be understood that the flows for handling of such calls for internal telephony applications (e.g., 325 of FIG. 3) is similar to the depicted flows and will therefore not be separately discussed.

The flow diagram of FIG. 4(*a*) illustrates an example in which a greeting is played for the calling client device. The call from the client (402) is received by an SIP or media server (e.g., 308 of FIG. 3) which hands the call off (404) to an API server (e.g., 326 of FIG. 3). The API server makes a session call (406) to a telephony application (e.g., 324 of FIG. 3) according to call handling rules associated with the extension to which the call is directed. The telephony application makes one or more calls to platform databases (408) (e.g., 316 of FIG. 3) via the corresponding API (e.g., 328 of FIG. 3) to obtain setting data (e.g., company, department, or individual settings or data, such as endpoint addresses or custom recordings) which, when obtained (410), it uses to generate application script. The script is then passed back (412) to the API server for execution, i.e., in this example, playback of a greeting (414), that is passed back to the client (416) by the SIP or media server.

The flow diagram of FIG. 4(*b*) illustrates an example in which a call to a client device (e.g., an automated calendar reminder) is generated. In this example, the application makes a call (452) to the API server to create a session (454). As in the previous example, the application makes one or more calls to platform databases (456) to obtain setting data (458) which it uses to generate application script. The script is passed back (460) to the API server for execution, i.e., in this example, the call to the client device (462), that is then established (464) by the SIP or media server.

As will be appreciated by those of skill in the art, because APIs implemented as described herein allow a deep level of integration with an underlying PBX platform, application developers have the ability to extend the functionality of the platform in a manner which can be seamless for customers of the PBX platform. For example, call center functionality for an enterprise may be established without having to create users in the context of the call center application or without having to establish a billing relationship between the enterprise and a call center provider, i.e., the enterprise already has users defined within the PBX platform, as well as a billing relationship that can be readily integrated with the call center functionality. It should be noted, however, that API implementations are contemplated which allow developers to specify additional parameters for existing accounts, users, extensions, etc., to support the functionality provided by their applications.

APIs implemented as described herein allow independent developers to provide telephony applications that access and enhance the functionality of the same underlying PBX platform. And such applications may be used by independent customers of the PBX platform to customize the telephony services provided by the platform in a manner which best suits the needs of each customer and, at least in some cases, to achieve that in a seamless manner.

It should be noted that, despite references to particular computing paradigms and software tools herein, the computer program instructions with which embodiments of the invention may be implemented may correspond to any of a wide variety of programming languages, software tools and data formats, and be stored in any type of volatile or nonvolatile, non-transitory computer-readable storage medium or memory device, and may be executed according to a variety of computing models including, for example, a client/server model, a peer-to-peer model, on a stand-alone computing device, or according to a distributed computing model in which various of the functionalities may be effected or employed at different locations. In addition, reference to particular protocols herein are merely by way of example. Suitable alternatives or those later developed known to those of skill in the art may be employed without departing from the scope of the invention.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A private branch exchange (PBX) platform, comprising one or more computing devices deployed in a network computing environment, the one or more computing devices being configured to provide telephony services to a plurality of independent enterprises, each of the enterprises having a plurality of users and extensions defined for that enterprise within the PBX platform, the one or more computing devices implementing a plurality of telecommunications interfaces with a plurality of independent telecommunications providers that facilitate at least a portion of the telephony services, the one or more computing devices also implementing one or more application programming interfaces (APIs) that enable each of a plurality of internal telephony applications hosted by the PBX platform and each of a plurality of external telephony applications developed and hosted on one or more other platforms independent of the PBX platform to integrate with the PBX platform at a corresponding plurality of integration points, the one or more APIs enabling each of the internal telephony applications and each of the external telephony applications to access the users and extensions for subscribing ones of the enterprises, and to control call flows for the subscribing enterprises at the corresponding integration points during execution of the call flows by the PBX platform, thereby enabling each of the enterprises to customize the telephony services using one or more of the internal or external telephony applications without requiring the enterprises to re-specify their respective users and extensions for the internal or external telephony applications.

2. The PBX platform of claim 1, wherein at least some of the internal telephony applications are developed in an application developer environment.

3. The PBX platform of claim 2, wherein at least some of the developers are also users associated with one or more of the enterprises.

4. The PBX platform of claim 2, wherein the one or more computing devices are further configured to provide a telephony application store in which at least some of the internal telephony applications are available for purchase by the enterprises.

5. The PBX platform of claim 1, wherein the plurality of telecommunications interfaces include a stateless low-level interface that provides signaling and media telephony primitives, and a high-level interface that tracks session states and provides function building blocks for the external telephony applications.

6. The PBX platform of claim 1, further comprising one or more data stores comprising an account data repository storing account data representing the users and extensions for each enterprise, a sessions data repository, a message data repository, and a call log data repository.

7. The PBX platform of claim 1, wherein the PBX platform has a plurality of client devices for which the PBX platform provides the telephony services, and wherein the PBX platform communicates with the client devices using the Session Initiation Protocol (SIP).

8. The PBX platform of claim 1, wherein billing for use of one or more of the external telephony applications by one of the enterprises is integrated with billing for use of the PBX platform by the enterprise.

9. The PBX platform of claim 1, wherein the telephony applications relate to one or more of interactive voice response functionality, call center functionality, call statistics functionality, voice mail functionality, or call blocking functionality.

10. A computer implemented method, comprising:
providing telephony services to a plurality of independent enterprises via a private branch exchange (PBX) platform deployed in a network computing environment, each of the enterprises having a plurality of users and extensions defined for that enterprise within the PBX platform, wherein a plurality of telecommunications interfaces with a plurality of independent telecommunications providers facilitate at least a portion of the telephony services;
providing one or more application programming interfaces (APIs) that enable each of a plurality of internal telephony applications hosted by the PBX platform and each of a plurality of external telephony applications developed and hosted on one or more other platforms independent of the PBX platform to integrate with the PBX platform at a corresponding plurality of integration points;
enabling each of the internal telephony applications and each of the external telephony applications to access the users and extensions for subscribing ones of the enterprises; and
enabling each of the external telephony applications to control call flows for the subscribing enterprises at the corresponding integration points during execution of the call flows by the PBX platform, thereby enabling each of the enterprises to customize the telephony services using one or more of the internal or external telephony applications without requiring the enterprises to re-specify their respective users and extensions for the internal or external telephony applications.

11. The method of claim 10, wherein at least some of the internal telephony applications are developed in an application developer environment.

12. The method of claim 11, wherein at least some of the developers are also users associated with one or more of the enterprises.

13. The method of claim 11, further comprising providing a telephony application store in which at least some of the internal telephony applications are available for purchase by the enterprises.

14. The method of claim 10, wherein the plurality of telecommunications interfaces include a stateless low-level interface that provides signaling and media telephony primitives, and a high-level interface that tracks session states and provides function building blocks for the external telephony applications.

15. The method of claim 10, wherein the PBX platform includes one or more data stores comprising an account data repository storing account data representing the users and extensions for each enterprise, a sessions data repository, a message data repository, and a call log data repository.

16. The method of claim 10, wherein the PBX platform has a plurality of client devices for which the PBX platform provides the telephony services, and wherein the PBX platform communicates with the client devices using the Session Initiation Protocol (SIP).

17. The method of claim 10, further comprising integrating billing for use of one or more of the external telephony applications by one of the enterprises with billing for use of the PBX platform by the enterprise.

18. The method of claim 10, wherein the telephony applications relate to one or more of interactive voice response functionality, call center functionality, call statistics functionality, voice mail functionality, or call blocking functionality.

19. A computer program product, comprising one or more application programming interfaces (APIs) for use with a private branch exchange (PBX) platform deployed in a network computing environment and configured to provide telephony services to a plurality of independent enterprises, each of the enterprises having a plurality of users and extensions defined for that enterprise within the PBX platform, and wherein the PBX platform employs a plurality of telecommunications interfaces with a plurality of independent telecommunications providers to facilitate at least a portion of the telephony services, the computer program product comprising one or more non-transitory computer-readable media having computer program instructions stored therein, the computer program instructions being configured such that, when executed by one or more computing devices, the computer program instructions cause the one or more computing devices to:

enable each of a plurality of internal telephony applications hosted by the PBX platform and each of a plurality of external telephony applications developed and hosted on one or more other platforms independent of the PBX platform to integrate with the PBX platform at a corresponding plurality of integration points;

enable each of the internal telephony applications and each of the external telephony applications to access the users and extensions for subscribing ones of the enterprises; and enable each of the external telephony applications to control call flows for the subscribing enterprises at the corresponding integration points during execution of the call flows by the PBX platform, thereby enabling each of the enterprises to customize the telephony services using one or more of the internal or external telephony applications without requiring the enterprises to re-specify their respective users and extensions for the internal or external telephony applications.

* * * * *